2848x
Sheet 1-2 Sheets.
B. Cummings.
Hand Loom.
Patented Oct. 3, 1817.
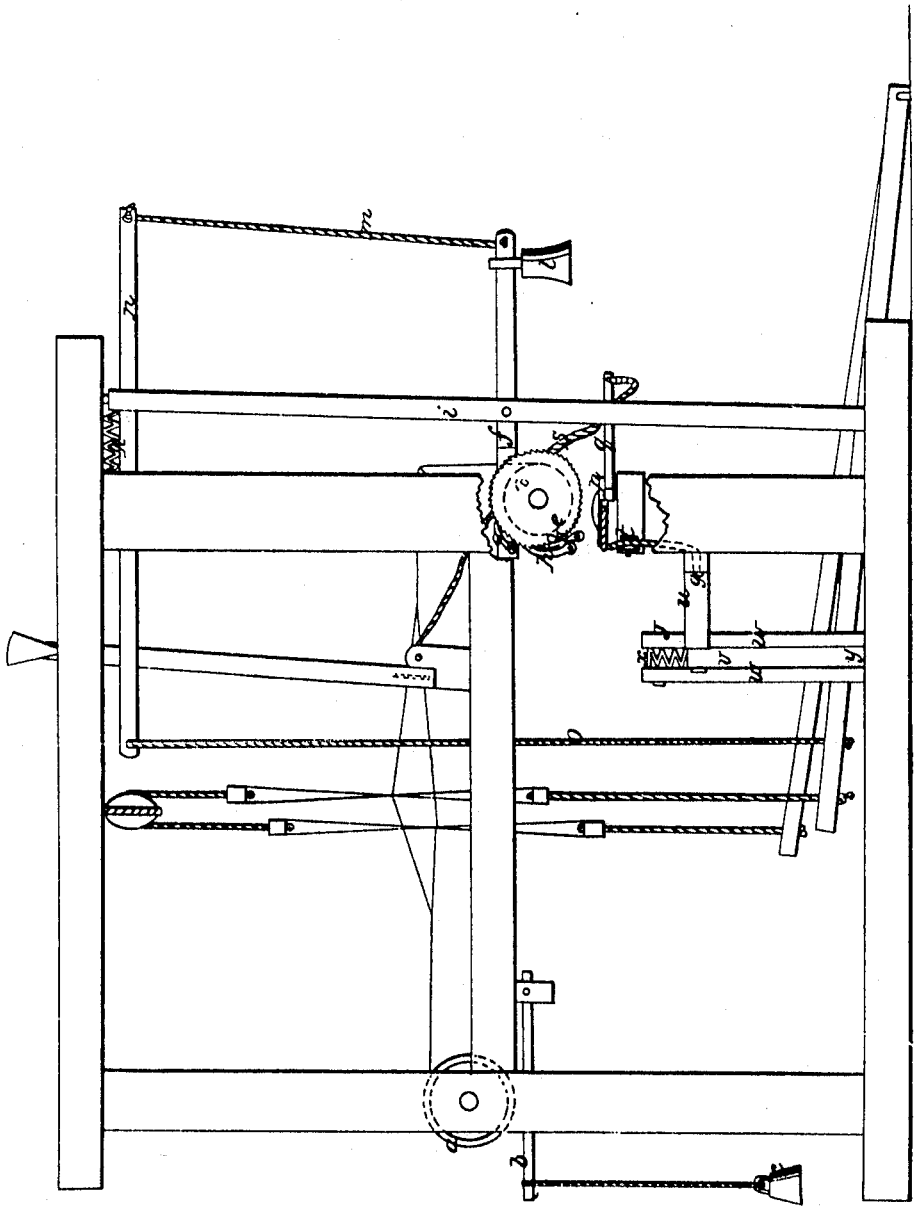

2848X
Sheet 2-2 Sheets.
B. Cumings.
Hand Loom.
Patented Oct. 3, 1817.
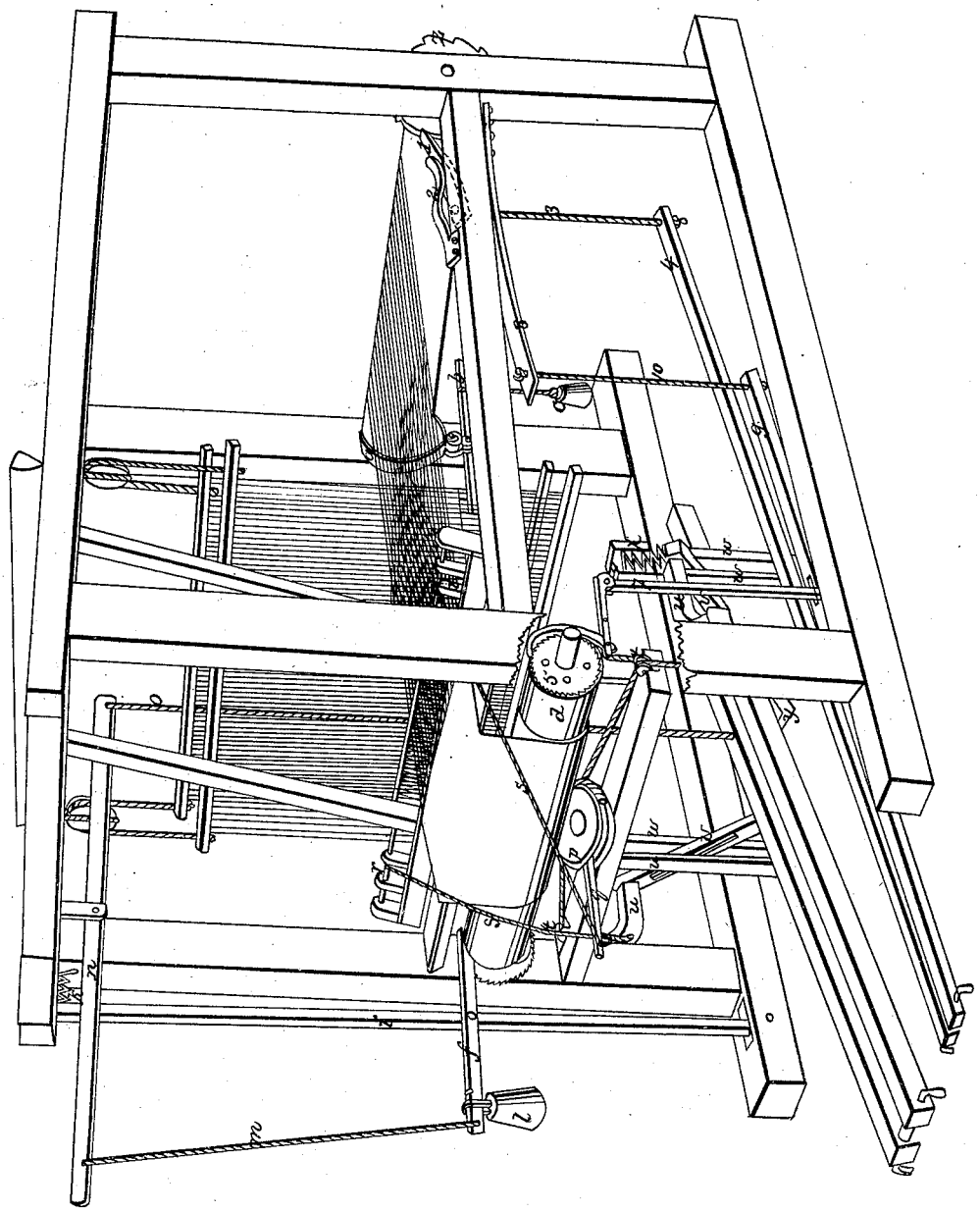
N. PETERS, PHOTO-LITHOGRAPHER, WASHINGTON, D. C.